United States Patent [19]

Schmidt

[11] Patent Number: 4,884,611

[45] Date of Patent: Dec. 5, 1989

[54] TIRE CHANGING MACHINE

[76] Inventor: Raymond H. Schmidt, R.R. 1, Box 238A, Buffalo, Minn. 55313

[21] Appl. No.: 261,636

[22] Filed: Oct. 24, 1988

[51] Int. Cl.$^4$ ............................................. B60C 25/07
[52] U.S. Cl. .................................... 157/1.24; 157/16; 157/1.17
[58] Field of Search ...................... 157/1.17, 1.2, 1.22, 157/1.24, 1.26, 1.28, 16, 18–21, 14

[56] References Cited

U.S. PATENT DOCUMENTS

| | | | |
|---|---|---|---|
| 3,142,330 | 7/1964 | Nelson. | |
| 3,426,827 | 2/1969 | Whited et al.. | |
| 3,493,030 | 2/1970 | Strang et al.. | |
| 3,522,832 | 8/1970 | Held et al. | 157/1.22 |
| 3,780,785 | 12/1973 | Schultz et al. | 157/1.24 |
| 3,856,070 | 12/1974 | Christie et al. | 157/13 |
| 3,866,655 | 2/1975 | Holladay | 157/1.24 |
| 3,891,019 | 6/1975 | Holladay | 157/1.24 |
| 4,061,173 | 12/1977 | Daly | 157/1.17 |
| 4,072,178 | 2/1978 | du Quesne | 157/1.17 |
| 4,209,053 | 6/1980 | du Quesne | 157/1.24 |
| 4,210,190 | 7/1980 | Hessels | 157/1.24 |
| 4,230,170 | 10/1980 | du Quesne | 157/1.24 |
| 4,245,686 | 1/1981 | Holladay | 157/1.1 |
| 4,267,867 | 5/1981 | du Quesne | 157/1.7 |
| 4,417,614 | 11/1983 | Cunningham et al. | 157/1.24 |
| 4,606,393 | 8/1986 | Cuccolini | 157/1.28 |

Primary Examiner—D. S. Meislin
Attorney, Agent, or Firm—Orrin M. Haugen; Thomas J. Nikolai; Frederick W. Niebuhr

[57] ABSTRACT

A machine for facilitating the removal and replacement of tire casings from and on the rims of vehicle wheels. The machine incorporates a first hydraulically actuated tool for breaking the bead of the tire casing to be removed free from the rim. Subsequently, the wheel is placed upon a motor driven turntable and clamped in place relative thereto by a second hydraulically actuated mechanism. Once the wheel and tire are clamped in place, a tool support head is brought into play for supporting a tire iron, the end of which is introduced between the rim and the tire's bead. Now, when a hydraulic motor is actuated, the turntable with the wheel and tire clamp thereto is rotated causing the tire bead on one side of the tire to be lifted free of the rim. The process is repeated for the tire bead surrounding the opposite side wall, at which point the old tire has been totally removed from the rim. When reinstalling a new tire, a special plow-like tool fastened to the end of the tool support head is brought into engagement with the bead of the side wall of the new tire and the wheel rim such that when the hydraulic motor is again energized to rotate the turntable, the tire bead is forced over the rim. The process is repeated from the remaining side wall.

6 Claims, 3 Drawing Sheets

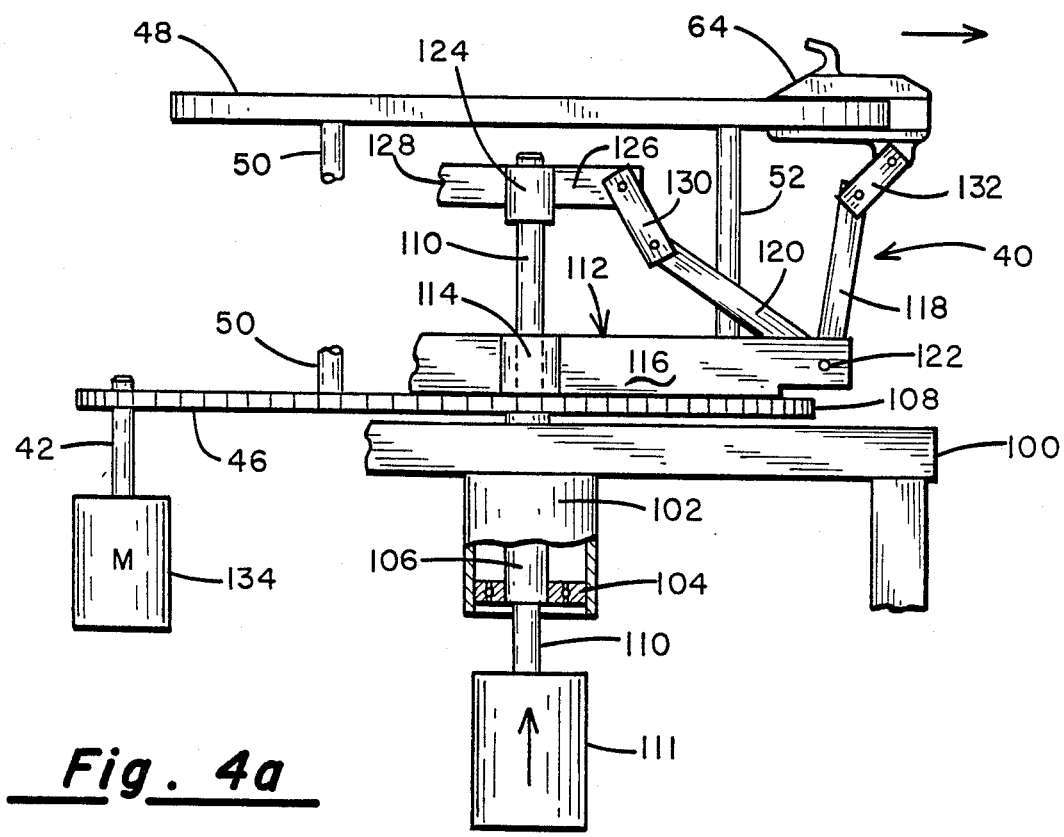
_Fig. 4a_
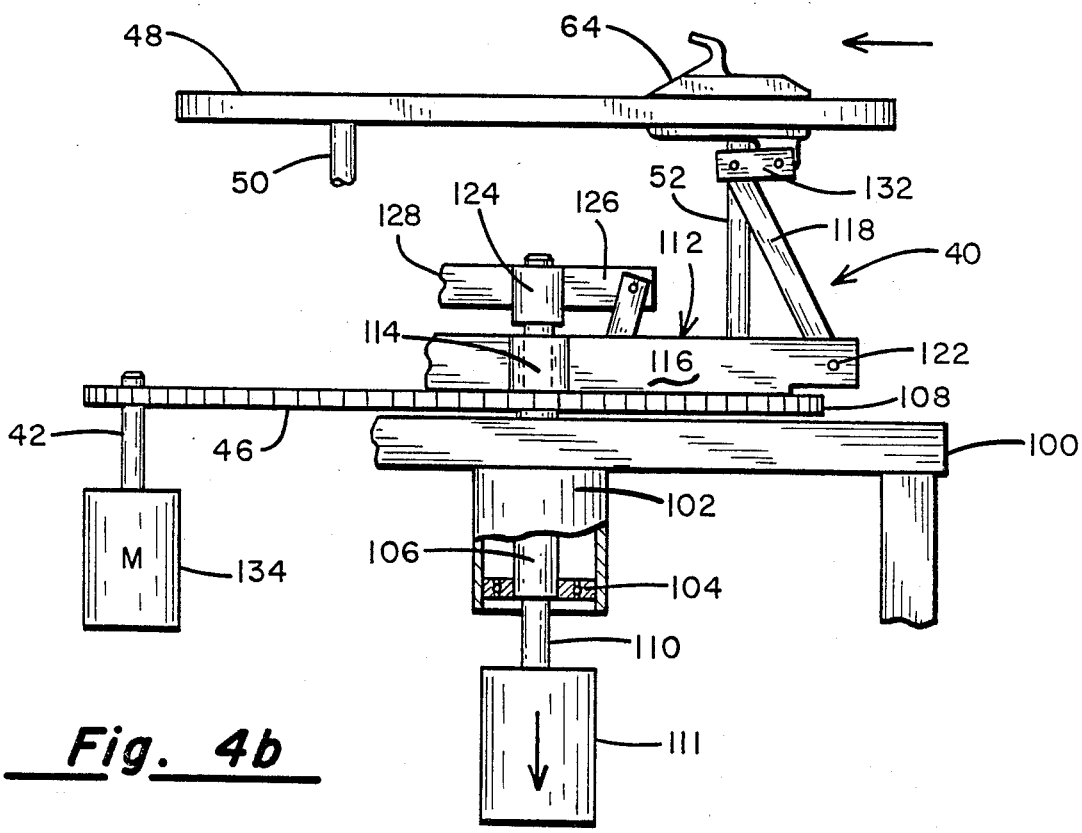
_Fig. 4b_

TIRE CHANGING MACHINE

BACKGROUND OF THE INVENTION

I. Field of the Invention

This invention relates generally to a machine for facilitating removal and replacement of tires on the rims of motor vehicles, and more particularly to a machine of the type described which is capable of accommodating a wide variety of sizes of tire rims and which includes an improved system for clamping and rotating the tire during the removal and replacement of a tire relative to its rim.

II. Discussion of the Prior Art

In the 1930's and early 1940's no machines had been devised for facilitating the changing of flat tires. Removal of an inflatable rubber tire from the wheel rim was totally a manual process involving the use of a series of pry bars called tire irons. Generally speaking, an uninflated wheel would be laid on the ground and an attempt would be made to break the bead free from the rim by first standing on the side wall and bringing as much force to bear as possible by jumping. Once the beads were broken loose from the rim, the repair person would pry the rubber tire free of the rim by inching along the periphery with a series of pry bars. The steps would be repeated when the new tire casing was being reinstalled.

In the late 1940's or early 1950's, some improvement had been made in the technology for facilitating the changing of vehicle tires and repairing flat tires. For example, the Nelson U.S. Pat. No. 3,142,330 discloses a hydraulically actuated bead breaker in which a shoe on the lower end of an arm is hydraulically actuated through a cylinder and a lever to apply a sufficient force for unseating the tire bead from the rim. The Strang et al U.S. Pat. No. 3,493,030, the Held U.S. Pat. No. 3,522,832 and the Schultz et al U.S. Pat. No. 3,780,785 each describe tire changing apparatus utilizing a rotatable horizontal table to which the wheel may be clamped. To achieve clamping, however, a conical chuck screwing onto a centrally disposed post passing through a central circular opening in the wheel rim is used to hold the tire onto the turntable. Such a machine is of limited current value, given the fact that many automotive wheels no longer have a central opening formed therethrough with which the prior art conical chuck can be made to cooperate. Then, too, in connection with those prior art machines, a series of manual operations were necessary to fit the clamping chuck in place and to screw it down to its clamping position. This necessarily made the clamping operation cumbersome and significantly more time-consuming.

The machine of the present invention obviates many of the drawbacks of the prior art identified above. In particular, the clamping arrangement for securing a tire to a turntable has been significantly improved so that the mere actuation of a hydraulic circuit will bring the clamping mechanism into play. Secondly, the clamping mechanism is not dependent upon the presence of a central opening in the tire's wheel rim, but instead, grips the rim in one or the other of two locations whereby tires of different sizes can be accommodated.

SUMMARY OF THE INVENTION

The foregoing objects and advantages are achieved in accordance with the present invention by providing a tire changing machine having a base or stand which contains a pneumatic or hydraulic system for actuating a pair of rams and to a hydraulic or pneumatic motor. One of the rams has its piston rod extending out through one side wall of the base cabinet and it attaches to an elongated arm which is pivotally connected at one end to the outside wall of the cabinet. On the free end of this arm is a shoe which is designed to engage the bead of the tire right next to the wheel rim. When the ram is actuated, the shoe is forced against the bead until it breaks free of the rim.

Projecting vertically upward through the top surface of the base cabinet is a piston rod of a second hydraulic or pneumatic ram. Surrounding the piston rod of this ram and journaled for rotation about it as an axis by suitable bearings is a large diameter circular gear having sprocket teeth cut on its periphery so as to receive an endless chain which also passes around a drive sprocket attached to the shaft of a hydraulic motor. Positioned above the large diameter gear and connected to it by a series of support posts is a tire support plate having three radially extending slots 120° apart extending from the periphery thereof toWard the center of the upper support plate and disposed in each such slot is a tire rim clamping jaw. The three jaws are arranged to slide in unison when the second, vertically oriented ram is actuated. To accomplish this, a series of three bell cranks and associated linkages are joined between the slidable clamping jaws and a spider affixed to the end of the actuator rod of the second ram.

The clamping jaws are configured to grip the outer diameter of smaller sized tire rims or to grip an inner surface and push outward to clamp larger diameter wheels, e.g., truck wheels. Thus, it is possible to clamp either an inward or outward edge surface of the rim while still allowing the chain drive to rotate the upper table while the clamping pressure is being applied.

Once the tire is mounted on the upper turntable, a tool support arm having a downwardly projecting leg is swung into position allowing a specially designed shoe to meet the tire and rim near the bead area. When the turntable is rotated, the specially shaped tool forces the tire bead over the rim through 360° of rotation. Likewise, when it is desired to free a tire from its rim, a bar (tire iron) is laid over the same specially shaped tool and the end of the bar is inserted between the tire's bead and the wheel rim so that when the turntable with the wheel clamped thereto is again rotated, the tire iron will cause the tire bead to be lifted upward and free of the rim. This step is repeated for each of the tire's two side walls.

The actuation of the bead-breaking cylinder, the clamping jaw cylinder and the hydraulic motor is controlled by suitable foot pedals positioned on the cabinet so as to be readily accessible to the operator.

DESCRIPTION OF THE DRAWINGS

These and other features and advantages of the invention will become apparent to those skilled in the art from the following detailed description of a preferred embodiment, especially when considered in conjunction with the accompanying drawings in which like numerals in the several views refer to corresponding parts.

FIG. 4(a) is a partial schematic and fragmentary side view showing the wheel clamping shoes in their radially extended position; and FIG. 4(b) is a partial schematic and fragmentary side view showing the tire gripping shoes in their radially contracted position.

DESCRIPTION OF A PREFERRED EMBODIMENT

Figure 1:
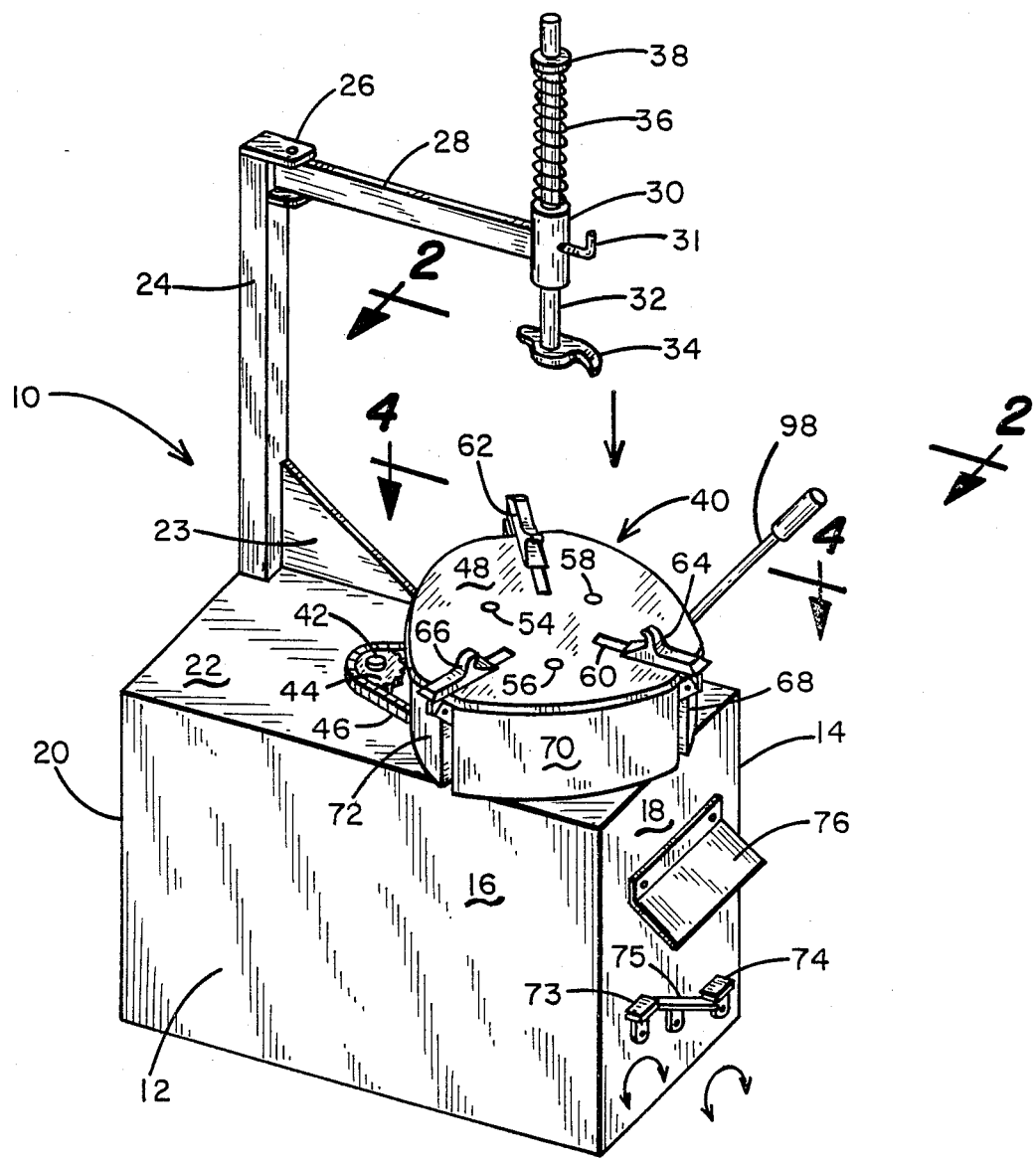
FIG. 1 is a perspective view of the improved tire changing machine of the present invention.
Figure 3:
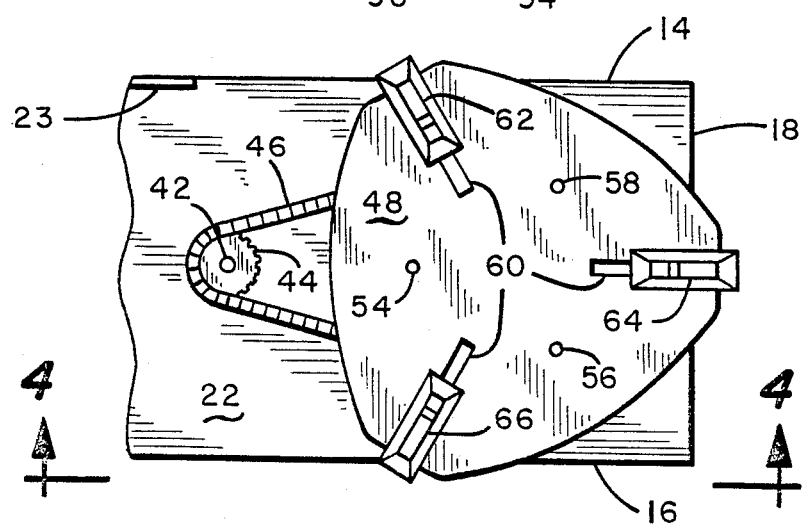
FIG. 3 is a top plan view of a portion of the machine of FIG. 1, particularly illustrating the wheel mounting turntable.

Referring first to FIGS. 1 and 3, there is indicated generally by numeral 10 the tire changing machine of the present invention. It is seen to include a base cabinet 12 having a box-like welded frame (not shown) to which right, left, front, rear and top sheet metal panels 14-22, respectively, are attached. The frame may be constructed in a conventional fashion from welded channels, angle iron, and where appropriate, as at 23, gussets are provided to yield the necessary structural strength and rigidity.

Projecting upwardly from the right rear corner is a tubular steel post 24, preferably having a rectangular cross-section to facilitate its attachment to the framework within the cabinet 12. Secured to the uppermost end of the post 24 by a clevis connection 26 is a horizontally extending arm 28 which, because of this mode of connection, is free to rotate, within limits, in a horizontal plane. Welded to the free end of the arm 28 is a short tubular stub member 30. The internal diameter of the stub 30 is dimensioned to slidingly receive a steel post 32. On the lower end of the post 32 is a combination tool support and casing plow head 34. A compression spring 36 located between the upper end of the tubular stub 30 and collar 38 affixed to the steel rod 32 normally urges the tool support and tire plow head 34 up and out of the way.

As will be explained in considerably more detail hereinbelow, supported above the sheet metal top panel 22 is a turntable and wheel clamping mechanism indicated generally by numeral 40. The turntable and wheel clamping assembly 40 is arranged to be rotated by a suitable drive motor, e.g., a hydraulic motor 134, disposed within the cabinet 12 but having its shaft 42 extending upwardly through an opening formed in the sheet metal panel 22. Attached to the shaft 42 is a sprocket wheel 44 having teeth for engaging an endless chain 46 which, as can best be seen in FIGS. 4a and 4b, passes around a large diameter circular plate having matching gear teeth formed on the peripheral edge thereof. Thus, when the hydraulic motor 134 is energized, the assembly 40 will be made to rotate about a vertical axis.

In addition to the large diameter circular gear plate which is not visible in FIG. 1, the turntable assembly further includes a top plate 48 which is mounted in a parallel and spaced relationship with respect to the lower, circular gear plate by a plurality of spacer posts, two of which 50 and 52 are seen in FIGS. 4(a) and 4(b). Visible in FIG. 1 are bolts 54, 56 and 58 used to fasten the posts 50 and 52 as well as one additional post not shown.

Formed through the thickness dimension of the turntable plate 48 and extending to the edge thereof are three radial slots 60 spaced 120° apart from one another. Extending through these slots are power actuated tire rim gripping jaws 62, 64 and 66. As will be further explained, the rim gripping jaws are arranged to move radially and horizontally toward and away from the center of the turntable top plate 48. The mechanism for actuating the jaw movement cannot be seen in the perspective view of FIG. 1 due to the sheet metal cover plates 68, 70 and 72 fastened to the vertical edge surfaces of the top plate 48 and projecting downwardly therefrom.

With continued attention to FIGS. 1 and 3, pivotally mounted with respect to the cabinet's front panel 18 is a foot pedal device 74 which the operator uses to control the clamping and unclamping action of the rim gripping jaws 62-66, the rotation of the turntable assembly 40 and the actuation of a bead breaker mechanism yet to be described. A shield plate 76 is positioned over the foot pedal control mechanism 74 to prevent accidental actuation of the machine components as might otherwise occur due to a falling tool or some other unintended event.

Figure 2:
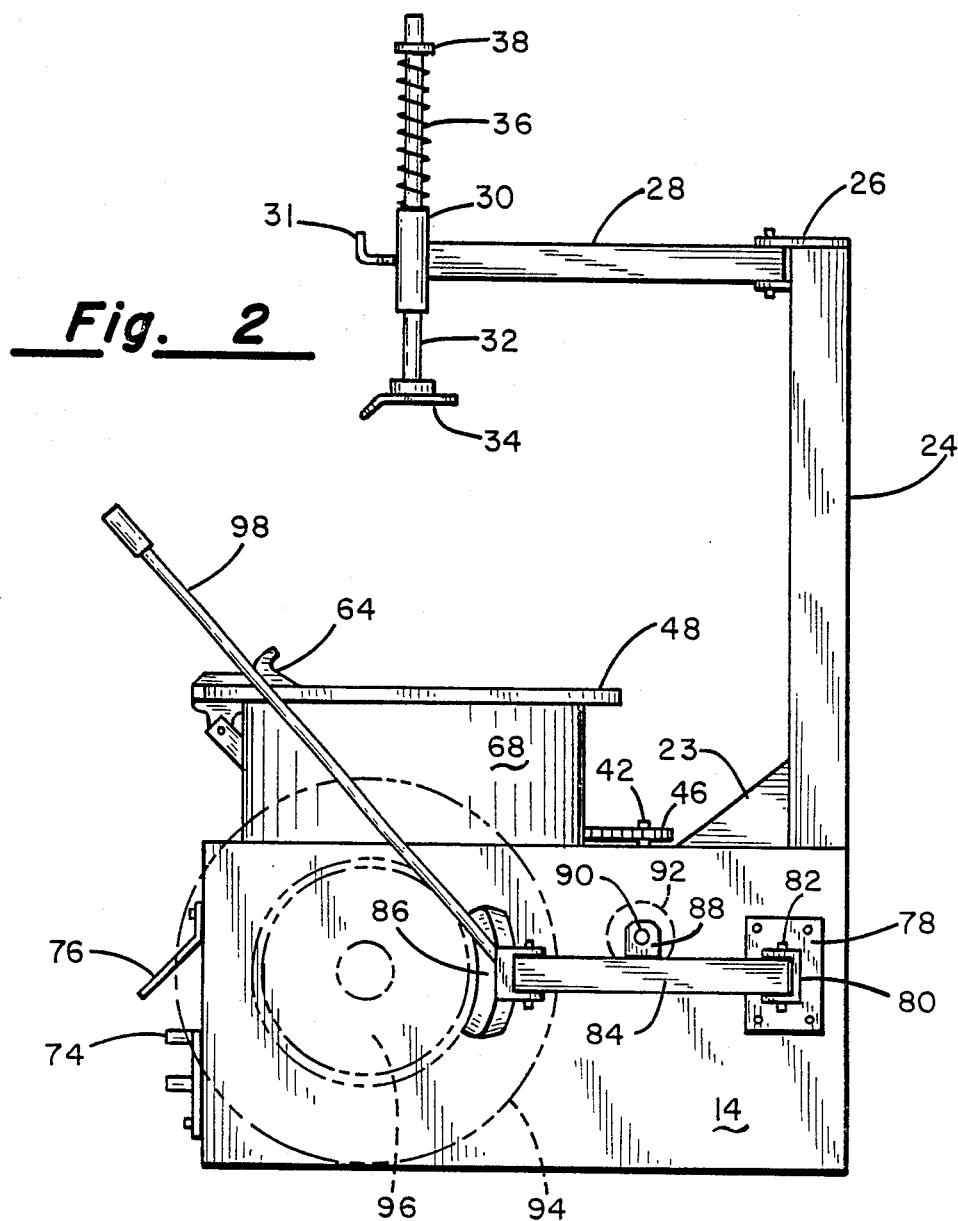
FIG. 2 is a right side elevation of the machine of FIG. 1.

Referring now to FIG. 2 in which is shown a right side view of the tire changing machine 10, the details of the bead breaking assembly portion of the machine will be described. As can be seen in this view, there is attached to the side panel 14 a hinge plate 78 supporting a U-shaped bracket 80 having aligned holes (not shown) formed through the opposed legs of the bracket for receiving a hinge pin 82 therethrough. The hinge pin also passes through a bore formed through the end of an elongated arm 84. Affixed to the other end of the arm 84 is a metal shoe 86 which is also pivoted to the arm.

Welded or otherwise affixed to the arm 84 approximately midway along its length is a bracket 88 to which a piston rod 90 of a pneumatic or hydraulic cylinder 92 is fastened. In the preferred embodiment, hydraulic components are illustrated, but it is recognized that pneumatic, electric or other type of actuators may also be employed. The cylinder 92 is axially disposed within the confines of the cabinet 12 and the piston rod 90 projects through an opening formed in the side panel 14.

To break the bead of a tire prior to the removal of the tire from its rim, the wheel is first positioned alongside the cabinet 12, as indicated by the phantom line representation which shows a tire 94 mounted on its rim 96. At this point, of course, the tire will be deflated. The operator, by manipulating the elongated handle 98, can position the metal shoe 86 so as to be immediately adjacent the intersection between the bead of the tire and the rim to which it is mounted. Once the shoe 86 is so positioned, the operator will actuate the foot pedal 75 so as to operate the hydraulic cylinder 92, drawing its piston rod 90 into the cylinder. The resulting lever action provided by the arm 84 pivoting about is fulcrum 82 applied a sufficient compressing force on the bead of the tire to break it loose from the rim. The operator will then extend the piston rod 90 from its cylinder, swinging the arm 84 outward from the side wall 14 of the cabinet, allowing him to turn the tire around so that the shoe 86 can be positioned against the bead associated with the still-attached tire side wall. Once this has been done, the foot pedal 75 is again actuated to operate the cylinder 92 drawing the arm 84 in toward the side 14 of the cabinet and applying a substantial compression force to the side wall of the tire immediately proximate its bead. This will free the second bead from the rim.

Referring to the partial and somewhat schematic views of FIGS. 4(a) and 4(b), an explanation will next be given to the mechanical construction of the turntable, its rotational support structure and the mechanism for operating the rim clamping jaws 62, 64 and 66. A portion of the frame to which the sheet metal side panels 14 through 22 are attached is identified by numeral 100 and provides a reference for showing the relative location of the mounting structure for the turntable assembly 40. Welded to the frame below the top channel 22 is a tubular bearing support member 102 which is partially broken away and sectioned so as to reveal an internal ball bearing assembly 104 which is operatively disposed between the bearing housing 100 and a vertical shaft 106 which passes through an opening in the cover panel 22 and is suitably attached to the underside of the turntable plate 108 which is provided with the sprocket teeth along its perimeter for receiving the endless chain 46.

The shaft 106 is also tubular in its configuration and passing through the axial bore thereof is a piston rod 110 of a vertically oriented hydraulic linear actuator 111. Welded or otherwise affixed to the upper surface of the turntable gear plate 108 is a spider 112 having a tubular hub 114 and three radially extending arms, only one of which is illustrated and is identified by numeral 116. The three arms are integrally formed with or welded to the hub 114 and radiate therefrom at 120° angles. Pivotally attached to the outer end of each arm is a L-shaped bell crank having joined legs 118 and 120. The pivot connection to the spider arm 116 is identified by numeral 122.

Journaled for rotation relative to the shaft 110 of the linear actuator 111 is a hub 124 to which are affixed three radially projecting arms of which only arms 126 and 128 are shown. Like the legs 116 on the spider 112, the arms 126, 128 and the remaining one which is not illustrated are spaced angularly at 120° and, thus, can be generally aligned with the legs 116 of the spider 112. Pivotally coupled to each of the arms 126 and 128 is a short linkage 130 which is also pivotally joined to the legs 120 of the bell crank. Likewise, a short linkage 132 is pivotally joined to the legs 118 of the bell crank and to the base portion of each of the clamping jaws 64 which project through the radial slots 60 formed in the upper table member 48. Suitable bushings (not shown) are contained within the hubs 114 and 124 to facilitate rotational movement of the turntable assembly about the piston rod or shaft 110 of the linear actuator 111 when the hydraulic motor 134 is energized to drive its shaft 42 and the small diameter sprocket wheel 44 secured thereto (FIG. 3).

The view of FIG. 4(a) shows the linear actuator 111 with the piston rod or shaft 110 thereof fully extended outwardly therefrom. The extension of the shaft 110 raises the hub 124, thus lifting and rotating the bell crank legs 118 and 120 to thereby urge the clamping jaws 62, 64 and 66 outwardly relative to the center of the wheel support table 48.

By observing the view of FIG. 4(b), which shows the relative location of the various parts when the linear actuator 111 has retracted its piston rod or shaft 110, it can be seen that pulling downwardly on the shaft 110 causes the hub 124 and the arms secured thereto to move downward and, in doing so, the bell crank leg 118 moves in the counterclockwise direction when viewed in FIG. 4(b). This pulls the wheel clamping jaws 60 through 64 simultaneously toward the center of the table 48, via the short linkage 122 joining the crank arm 118 to the slidable wheel jaws.

While the views of FIGS. 4(a) and 4(b) show only one of the three jaws and the linkages associated therewith, it is to be understood that all three jaws have similar bell crank couplings to the arms affixed to the hub 124 such that they all move in unison along their 120° oriented slots 60 toward the center of the table when the shaft 110 moves downward and away from the center of the table 48 when the actuator 111 causes its associated piston rod 110 to move to the upper disposition shown in FIG. 4(a).

Irrespective or whether the linear actuator shaft 110 is raised or lowered, the entire turntable assembly 40 including the lower gear plate 108, the spider assembly 112, the hub 124 and the bell cranks and their associated linkages all are free to rotate in unison either in the clockwise or counterclockwise direction about the shaft 110 as an axis.

OPERATION

The mode of operation of the bead breaking apparatus has already been described and need not be repeated here. Once the beads have been freed from the rim on both sides of the tire, the operator positions the tire horizontally on the upper surface of the table 48 and then, by appropriately manipulating the foot pedal 73, will cause the jaws 62, 64 and 66 to move inward to clamp smaller diameter rims such as used on passenger automobiles by gripping the edges of the rim and pushing radially inward thereon. For larger diameter wheels, such as truck tires or the like, the linear actuator 11, e.g., a hydraulic cylinder, will be actuated so as to raise the hub 124 and force the clamping jaws radially outwardly to engage a portion of the rim to hold it in place by the outward directed forces exerted thereon by the three jaws 62, 64 and 66. Next, the operator will pull down on the tool support shaft 32 against the force of the compression spring 36 until the tool head 34 is disposed at a predetermined position proximate the uppermost side wall of the tire which is to be freed from its hub. The operator will then lock the shaft in position using angle set screw 31 and use the head 34 as a rest to support a hand-held steel bar (tire iron), the lower end of which is wedged between the rim and the rubber tire. Once that is done, the foot pedal 74 is actuated so as to energize the hydraulic motor 134 to rotate the turntable 40 and the wheel secured to it. The rotation of the tire with the tire iron disposed in position will plow the tire's bead to lift it over the edge of the rim. Once a 360° rotation has been achieved, one side of the tire casing will be completely free of the rim.

Next, the operator will reposition the tire iron so that it is supported by the tool head 34 with an end thereof inserted between the bead of the lower side wall and the upper rim periphery. Once that has been done, the foot pedal 74 is again actuated appropriately to cause the rotation of the turntable to now lift the lowermost side wall over the upper rim.

Once the old tire carcass has been removed from its rim, a new tire can be reinstalled, substantially by reversing the above-described process. In this instance, however, the tool head 34 is lowered so as to engage the tire side wall and extend partially beneath the steel rim. Then, when the turntable is again rotated by the operation of the motor 134, the plowing action of the tire relative to the stationary tool head 34 will force the tire bead over the steel rim. This operation is twice repeated so that both side walls will clear the rim and will be loosely fitting between the two. Now, by introducing a high volume of air under pressure into the tire, the beads of the side walls can be made to pop into place relative to the rim and create an air-tight seal, allowing inflation to a desired pressure and completing the tire changing operation.

It is to be noted that the clamping jaws 62, 64 and 66 are designed so that they cooperate with the wheel rim, obviating the need for a central opening in the rim. As mentioned in the introductory portion of this specification, this is an important advantage, given the fact that many newer automobiles no longer utilize a tire rim having a central circular opening formed through it for accommodating the vehicle's wheel hub. Furthermore, the need for a truncated cone clamping chuck is disposed with, thus simplifying and speeding up the clamping phase of the tire changing process.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. A machine for use in facilitating the removal and replacement of an inflatable vehicle tire on a wheel rim, comprising:
   (a) a base cabinet containing a vertically disposed linear actuator having a cylindrical piston extendable and retractable between first and second elevations;
   (b) a turntable journaled for rotation atop said base cabinet about said cylindrical piston as an axis;
   (c) means for rotating said turntable alternatively in a clockwise or a counterclockwise direction about said axis;
   (d) a wheel support table attached in parallel, vertically spaced-apart, superposed relation to said turntable, said wheel support table having a plurality of radially movable wheel rim clamping jaws slidably joined thereto;
   (e) means coupling said piston of said vertically disposed linear actuator to said plurality of movable clamping jaws for sliding said jaws from one radial position to another on said wheel support table when said piston of said vertically disposed linear actuator is extended and retracted between said first and second elevations for releasibly securing a vehicle wheel to said wheel support table;
   (f) a horizontally disposed linear actuator affixed to and contained within said base cabinet and having a reciprocally movable piston rod extending through a side wall of said base cabinet;
   (g) a lever arm pivotally secured at one end thereof to the outer surface of said side wall of said base cabinet and a shoe plate affixed to the other end thereof, said piston rod of said horizontally disposed linear actuator being coupled to said lever arm at a point intermediate said one and said other ends; and
   (h) means for initially aligning said shoe plate in the bead area of said inflatable vehicle tire prior to actuation of said horizontally disposed linear actuator, whereby upon actuation of said horizontally disposed linear actuator, movement of said lever arm breaks the seal between said bead and said wheel rim.

2. The machine as in claim 1 and further including a tool support means pivotally secured relative to said base for positioning a tire engaging tool at a predetermined location relative to said vehicle wheel when said wheel is clamped to said wheel support table.

3. The machine as in claim 1 wherein said vertically disposed and horizontally disposed linear actuators are each hydraulically actuated.

4. A machine for use in facilitating the removal and replacement of an inflatable vehicle tire on a wheel rim, comprising:
   (a) a base cabinet containing a vertically disposed linear actuator having a cylindrical piston extendable and retractable between first and second elevation;
   (b) a relatively large diameter circular disk having gear teeth cut on the peripheral edge thereof and a centrally positioned, tubular, stub axle attached to a major surface thereof and projecting downwardly therefrom through a top surface of said base cabinet;
   (c) a tubular bearing housing attached to and disposed within said base cabinet, said bearing housing containing bearing means surrounding said tubular stub axle;
   (d) a tabular hub having a plurality of radially extending arms attached to the other major surface of said circular disk and rotatable therewith;
   (e) said tubular bearing housing, said tubular stub axle and said tubular hub surrounding said piston of said vertically disposed linear actuator to be rotatable thereabout;
   (f) means for rotating said large diameter circular disk alternatively in a clockwise or a counterclockwise direction about said axis;
   (g) a wheel support table attached in parallel, vertically spaced-apart, superposed relation to said large diameter circular disk, said wheel support table having a plurality of radially movable wheel rim clamping jaws slidably joined thereto; and
   (h) means coupling said piston of said vertically disposed linear actuator to said plurality of movable clamping jaws for sliding said jaws from one radial position to another on said wheel support table when said piston of said vertically disposed linear actuator is extended and retracted between said first and second elevations for releasibly securing a vehicle wheel to said wheel support table.

5. The machine as in claim 4 wherein said means for rotating said turntable is a hydraulic motor-driven, relatively small diameter, gear and means for operatively coupling said small diameter gear to said relatively large diameter circular disk.

6. The machine as in claim 4 wherein said means coupling said piston of said vertically disposed linear actuator to said plurality of movable clamping jaws comprises:
   (a) a generally L-shaped bell crank member pivotally coupled to the free end of each of said plurality of radially extending arms radiating from said tubular hub;
   (b) a spider member journaled for rotation on said piston of said vertically disposed linear actuator, said spider member including a plurality of radially extending arms equal in number to the number of radial arms on said tubular hub and generally vertically aligned therewith;

(c) link means pivotally coupling the free ends of said L-shaped bell cranks individually to said radially extending arms of said spider member and to said movable clamping jaws whereby movement of said piston of said vertically disposed linear actuator between said first and second elevations imparts radially directed sliding motion to said movable clamping jaws.

* * * * *